United States Patent Office 3,325,448
Patented June 13, 1967

3,325,448
STABILIZED POLYOLEFIN CONTAINING A QUINOXALINE DERIVATIVE OR A METAL SALT THEREOF
Sanae Tanaka and Katsura Yokoyama, Setagaya-ku, Tokyo, and Masao Takashima, Kita-ku, Yokohama-shi, Japan, assignors to Mitsubishi Petrochemical Company Limited, Tokyo, Japan, a corporation of Japan
No Drawing. Filed Nov. 14, 1963, Ser. No. 323,572
Claims priority, application Japan, Nov. 15, 1962, 37/49,969; Jan. 12, 1963, 38/541
4 Claims. (Cl. 260—45.75)

The present invention relates to stabilized polyolefin compositions, more particularly relates to additives which are effective to protect the compositions from deterioration or fully delay the deterioration to such an extent that the compositions are not affected practically, by adding them in small amount to polyolefin which is liable to deteriorate due to exposure to sunlight or ultraviolet rays.

Of years, techniques for manufacturing polyolefin have been developed markedly, and, as a result, crystalline polyolefin such as linear polyethylene or stereospecific polypropylene has come to be manufactured. It is generally well known that because of the regularity of these crystalline polymers' structure, their crystallinity is very high and their mechanical and electrical properties and chemical resistance are extremely superior.

However, these crystalline polyolefins have such defects that due to actions of heat, sunlight or ultraviolet rays, etc., they are liable to deteriorate, cause the so-called deterioration and markedly reduce their mechanical, electrical and chemical properties. Therefore, it is necessary to prevent polyolefin from deterioration due to sunlight and ultraviolet rays and increase its weather resistance especially when polyolefin is used as film or fiber.

Heretofore, there has been used a process for incorporating a little quantity of ultraviolet ray absorbent into plastic, fiber, paint, toilet articles, etc. with a view to preventing their light deterioration. However, although well-known ultraviolet ray absorbents were mixed with polyolefin, almost no effect was brought about. This was because miscibility and intersolubility between ultraviolet ray absorbents and polyolefin were small, losses were great and because thermal stability of ultraviolet ray absorbents was not enough, etc. There are many ultraviolet ray absorbents which cause deterioration of colouring and molecular weight at the time of ordinary high-temperature processing, and they are unsuitable as polyolefin stabilizer. Usually, thermal stabilizers are mixed with polyolefin to prevent its thermal deterioration, but such thermal stabilizers as will show antagonistic effects, that is, ultraviolet ray absorbent chemically combines with these thermal stabilizers or said thermal stabilizers make their thermal stabilization effect decline or make their own light stabilization effect decrease, are unsuitable. In order to satisfy these necessary conditions, it is earnestly desired to develop light stabilizer for polyolefin, but it is difficult to obtain the hoped-for light stabilizers. This has been a serious hindrance when polyolefin was used as film or fiber.

As a result of our earnest studies, we have succeeded in attaining the present invention, and it has become possible to satisfy the aforesaid conditions and to fully supply weather resistance polyolefin compositions.

According to the present invention, we provide polyolefin compositions containing quinoxaline derivatives represented by the general formulas:

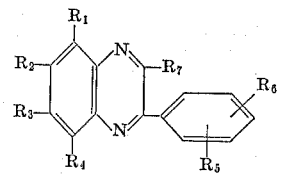

wherein $R_1$, $R_2$, $R_3$, $R_4$, $R_5$ and $R_6$ stand for hydrogen and halogen atoms, hydroxyl, $C_{1-18}$ alkyl, $C_{1-18}$ aliphatic alkoxy and aryl radicals, $R_7$ stands for hydrogen and halogen atoms, $C_{1-18}$ alkyl, $C_{1-18}$ aliphatic alkoxy radicals and aryl and aryl radicals substituted thereby, or metal salts of quinoxaline derivatives represented by the general formulas:

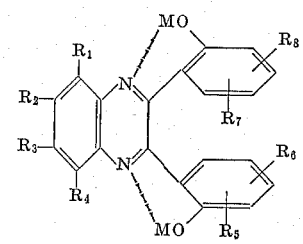

wherein $R_1$, $R_2$, $R_3$, $R_4$, $R_5$, $R_6$, $R_7$, and $R_8$ stand for hydrogen and halogen atoms, hydroxyl, $C_{1-18}$ alkyl, $C_{1-18}$ aliphatic alkoxy and aryl radicals and M stands for a metal of Groups I to II of Periodic Table and a transition metal.

The polyolefin compositions according to the present invention have the characteristics that not only they have a high inhibiting effect for light ray deterioration, but also their weather-proofing is increased due to the symergism of combination of them and other thermal stabilizers such as ester of 3,3'-thiodipropionic acid and calcium stearate. In the combination of the heat stabilizers and the light ray stabilizers, only the co-use of carbon black and Santonox (trade name: 4,4'-thiobis(6'-t-butyl - 3 - methyl)-phenol) has been known hithertofore and thus other effective combinations have not bee proposed practically.

As the examples of the quinoxaline derivatives and metal salts thereof which may be effectively used in the present invention, there may be mentioned 2,3-bis(2'-hydroxyphenyl)quinoxaline, 2,3 - bis(2'-hydroxy-4'-methylphenyl)quinoxaline, 2,3 - bis(2' - hydroxy-4'-methoxyphenyl)quinoxaline, 2 - (2'-hydroxy-4'-methylphenyl)-3-octylquinoxaline, 2 - (2' - hydroxy - 4'-methylphenyl)-3-methyl-6-chloroquinoxaline, 2 (2'-hydroxy-4-'-methoxyphenyl) - 3-ethylquinoxaline and 2,3-bis(2'-hydroxy-4'-methylphenyl)-6-chloroquinoxaline and their metallic salts, for example their copper, nickel and cobalt salts.

The above mentioned stabilizers may be generally used by mixing polyolefin with the stabilizers with agitation or by mixing polyolefin with a solution of the stabilizers dissolved into a suitable solvent and then evaporating the solvent or by adding the stabilizers in the end of polymerization of olefin.

The quinoxaline derivatives and metal salts thereof may be present in the polyolefin composition in an amount between 0.001 to 10% by weight of the polyolefin.

2,3 - bis(2'-hydroxypenyl)quinoxaline and 2,3-bis(2'-hydroxy-4'-methylphenyl)quinoxaline and their metallic salts which are the stabilizers in the present invention may be manufactured as follows:

(1) 3.6 g. (0.03 mol) of orthophenylenediamine and 10 g. (0.03 mol) of 2,2'-dihydroxybenzyl were dissolved into 100 ml. of ethanol and the solution was boiled under reflux for 30 minutes to precipitate pale-yellow crystal. The reaction mixture was cooled to a room temperature and then filtrated to obtain 0.2 g. (yield: 81.7%) of pale-yellow piller crystal of 2,3 - bis(2' - hydroxyphenyl)quinoxaline having a melting point of 189° to 190° C.

*Analysis.*—Calculation: C, 76.41%; H, 4.48%; O, 10.18%; N, 8.91%. Found: C, 76.30%; H, 4.46%; O, 10.23%; N, 8.93%.

(2) 2,3 - bis(2'-hydroxyphenyl)quinoxaline was dissolved in equivalent of 5% aqueous potassium hydroxide solution and alcohol with heating and then the solution was added with equi-molar aqueous cupric chloride solution. The formed precipitate was filtrated off from the solution and was washed with a cold alcohol to obtain 11.3 g. (yield: 93.0%) of yellowish-green powder of copper salt of 2,3 - bis(2' - hydroxyphenyl)quinoxaline. Copper content: 15.8% (theoretical 16.9%).

(3) 4 g. (0.037 mol) of orthophenylenediamine and 10 g. (0.037 mol) of 2,2'-hydrodioxy-4,4'-dimethoxybenzyl were dissolved into 100 ml. of ethanol, and the solution was boiled under reflux for 2 hours and was cooled after a pale-yellow crystal was crystallized out from the solution. The precipitate was filtrated off from the solution to obtain 8.5 g. (yield: 67.5%) of pale-yellow piller crystal of 2,3-bis(2'-hydroxy-4'-methoxyphenyl)quinoxaline having a melting point of 187° to 188° C.

*Analysis.*—Calculation: C, 77.17%; H, 5.29%; O, 9.34%; N, 8.18%. Found: C, 76.92%; H, 5.26%, O, 9.40%; N, 8.13%.

(4) 2,3 - bis(2' - hydroxy - 4' - methoxyphenyl)quinoxaline was dissolved into equivalent of 5% aqueous potassium hydroxide solution and alcohol with heating and then the solution was added with equi-molar aqueous cupric chloride solution. The formed precipitate was filtrated off from the solution and was washed with a cold alcohol to obtain 8.9 g. (yield: 91%) of yellowish-green powder of nickel salt of 2,3-bis(2'-hydroxy-4-'-methoxyphenyl)quinoxaline. Nickel content: 13.3% (theoretical: 13.7%).

The present invention is illustrated but not limited by the following examples.

Example 1

10 g. of powdered crystalline polypropylene (mean molecular weight: more than 15,000; density: about 0.91 and intrinsic viscosity in Tetralin at 135° C.: about 1.48) was added with 50 mg. (0.5%) of the stabilizers which were shown in Table 1. The mixture was moulded into a sheet of 0.3 mm. thickness by heating the mixture at the temperature of 220° C. for about 5 minutes in a press. The obtained samples were subjected to ultraviolet ray exposure test by a conventional method at black panel temperature of 60° C. in Atlas type fade meter. The deterioration time of these samples are shown in Table 1, compared with prior stabilizers.

TABLE 1

| Stabilizer: | Deterioration time (hrs.) |
|---|---|
| None | 70 |
| Phenyl salicylate | 190 |
| 2-(2'-hydroxy-5'-methylphenyl)benzotriazole | 280 |
| 2,3-bis(2'-hydroxyphenyl)quinoxaline | 300 |
| 2,3 - bis(2' - hydroxy - 4' - methylphenyl - quinoxaline | 350 |
| 2,3 - bis(2' - hydroxy - 4' - methoxyphenyl)quinoxaline | 300 |

Example 2

The results which were obtained by testing the stabilizers shown in Table 2 as described in Example 1 were shown in Table 2, compared with other stabilizers. From the results, it is clear that the combination of the stabilizers in the present invention and other stabilizers has a considerable effect.

TABLE 2

| Stabilizer: | Deterioration time (hrs.) |
|---|---|
| None | 70 |
| (a) 3,3'-thiodilauryl propionate (0.2%) | 70 |
| (b) 2,6-di-t-butyl-4-methylphenol (0.2%) | 75 |
| (a) 0.2%+(b) 0.2% | 100 |
| (c) 2,3 - bis(2' - hydroxyphenyl)quinoxaline (0.5%) | 300 |
| (d) 2,3 - bis(2'-hydroxy-4'-methylphenyl)quinoxaline (0.5%) | 350 |
| (e) 2,3 - bis(2' - hydroxy - 4'-methoxyphenyl)quinoxaline (0.5%) | 300 |
| (a) 0.2%+(b) 0.2%+2-(2'-hydroxy-5'-methylphenyl)benzotriazole (0.5%) | 380 |
| (a) 0.2%+(b) 0.2%+(c) 0.5% | 1,000 |
| (a) 0.2%+(b) 0.2%+(d) 0.5% | 1,200 |
| (a) 0.2%+(b) 0.2%+(e) 0.5% | 700 |

Example 3

Films of 0.5 mm. in thickness were manufactured by the same method as described in Example 1. These films were subjected to an ultraviolet ray exposure as described in Example 1. The changes of electrical property of films were shown in dielectric power factor (tan δ), in Table 3.

TABLE 3

| Stabilizer | Tan δ 0 hr. after exposure | Tan δ 100 hrs. after exposure | Tan δ 200 hrs. after exposure |
|---|---|---|---|
| None | $2.4 \times 10^{-4}$ | $13.0 \times 10^{-4}$ | $37.0 \times 10^{-4}$ |
| 3,3'-thiodilauryl propionate (0.2%)+2,6-di-t-butyl-4-methylphenol (0.2%) | $2.3 \times 10^{-4}$ | $10.0 \times 10^{-4}$ | $35.0 \times 10^{-4}$ |
| 2-(2'-hydroxy-4-methylphenyl)benzotriazole | $2.5 \times 10^{-4}$ | $10.0 \times 10^{-4}$ | $23.0 \times 10^{-4}$ |
| 2,3-bis(2'-hydroxyphenyl)quinoxaline | $2.2 \times 10^{-4}$ | $3.0 \times 10^{-4}$ | $3.2 \times 10^{-4}$ |
| 2,3-bis(2'-hydroxy-4-methylphenyl)quinoxaline | $4.0 \times 10^{-4}$ | $5.5 \times 10^{-4}$ | $5.7 \times 10^{-4}$ |
| 2,3-bis(2'-hydroxy-4'-methoxyphenyl)quinoxaline | $3.3 \times 10^{-4}$ | $4.0 \times 10^{-4}$ | $7.0 \times 10^{-4}$ |

NOTE.—Cycle 1 mc.

Example 4

10 g. of powdered crystalline polypropylene (mean molecular weight: about 350,000; density: about 0.91 and intrinsic viscosity in tetraline at 135° C. (2.36) were mixed with the stabilizers according to the present invention and the prior stabilizers as shown in Table 4 in the amount of 50 mg. (0.5% by weight), respectively. The mixture was moulded into a sheet of 0.3 mm. thickness by heating the mixture at the temperature of 220° C. for about 5 hours in a press. These samples were subjected to an ultraviolet ray exposure test by a conventional method at black panel temperature of 60° C. in Atlas type fade meter. The deterioration time of the samples are shown in Table 4.

TABLE 4

Stabilizer: Deterioration time (hrs.)
None _____ 70
Phenyl salicylate _____ 190
2-(2'-hydroxy-5'-methyl)benzotriazole _____ 280
2,3 - bis(2'-hydroxyphenyl)quinoxaline nickel salt _____ 360
2,3 - bis(2'-hydroxy-4'-methylphenyl) quinoxaline nickel salt _____ 365

*Example 5*

With the same method as described in Example 4, the stabilizers according to the present invention and the other antioxidants as shown in Table 5 were incorporated into polypropylene and the former compositions were tested as described in Example 4. The obtained results are shown in Table 5. From the results, it is clear that the combination of the stabilizers according to the present invention and the other antioxidants give a considerable effect.

TABLE 5

Stabilizer: Deterioration time (hrs.)
None _____ 70
(a) 3,3'-thiodilauryl propionate (0.2%) _____ 70
(b) 2,6-di-t-butyl-4-methylphenol (0.2%) ____ 75
(a)+(b) _____ 100
(c) 2,3 - bis(2'-hydroxy-4'-methylphenyl)quinoxaline nickel salt (0.5%) _____ 365
(d) 2,3-bis(2'-hydroxyphenyl)quinoxaline copper salt (0.5%) _____ 330
(a)+(b)+2 - (2'-hydroxy - 5' - methylphenyl) benzotriazole (0.5%) _____ 380
(a)+(b)+(c) _____ 800
(a)+(b)+(d) _____ 700

*Example 6*

Films of 0.5 mm. thickness were manufactured by the same method as described in Example 4. These films were subjected to an ultraviolet ray exposure as described in Example 4. The changes of electrical property of film are shown in dielectric power factor (tan δ), in Table 6.

TABLE 6

| Stabilizer | Tan δ (×10⁻⁴) | | |
|---|---|---|---|
| | 0 hr. | 100 hrs. | 200 hrs. |
| None | 2.4 | 13.0 | 37.0 |
| 3,3'-thiodilauryl propionate 2,6-di-t-butyl-4-methylphenol (each 0.2%) | 2.3 | 10.0 | 35.0 |
| 2-(2'-hydroxy-4'-methylphenyl)benzotriazole (0.5%) | 2.5 | 10.0 | 23.0 |
| 2,3-bis(2'-hydroxy-4'-methylphenyl)-quinoxaline nickel salt (0.5%) | 2.0 | 2.1 | 2.1 |
| 2,3-bis(2'-hydroxyphenyl)quinoxaline copper salt (0.5%) | 2.5 | 3.1 | 4.1 |
| 2,3-bis(2'-hydroxy-4'-methoxyphenyl)-quinoxaline copper salt (0.5%) | 4.2 | 8.4 | 10.0 |

Note.—Cycle 1 mc.

What we claim is:
1. A composition stabilized against degradation due to U.V. light comprising a polyolefin selected from the group consisting of polyethylene and polypropylene containing 0.001 to 10% by weight of said polyolefin of a quinoxaline derivative selected from the group consisting of (1) 2,3-bis(2'-hydroxyphenyl)quinoxaline, 2,3-bis(2' - hydroxy - 4' - methylphenyl)quinoxaline, 2,3-bis(2' - hydroxy - 4' - methoxyphenyl)quinoxaline, 2-(2'-hydroxy - 4' - methylphenyl) - 3 - octylquinoxaline, 2-(2' - hydroxy - 4' - methylphenyl) - 3 - methyl-6-chloroquinoxaline, 2 - (2'-hydroxy - 4' - methoxyphenyl)-3-ethylquinoxaline and 2,3 - bis(2'-hydroxy - 4' - methylphenyl)-6-chloroquinoxaline and (2) nickel, cobalt and copper salts of said quinoxaline derivatives.

2. The composition of claim 1 containing additionally 2,6-di-t-butyl-4-methyl phenol and dilauryl 3,3' - thiodipropionate.

3. The composition of claim 2, wherein the polyolefin is selected from the group consisting of polyethylene, polypropylene, poly-4-methyl-pentene-1, polybutadiene, and polyisoprene.

4. The composition of claim 1, wherein the polyolefin is selected from the group consisting of polyethylene, polypropylene, poly-4-methyl-pentene-1, polybutadiene, and polyisoprene.

No references cited.

LEON J. BERCOVITZ, *Primary Examiner.*
G. W. RAUCHFUSS, *Assistant Examiner.*